July 26, 1966     H. B. CARROLL     3,262,347
TOOL CARRYING ASSEMBLY FOR ENGINE LATHES
Filed June 1, 1964     2 Sheets-Sheet 1
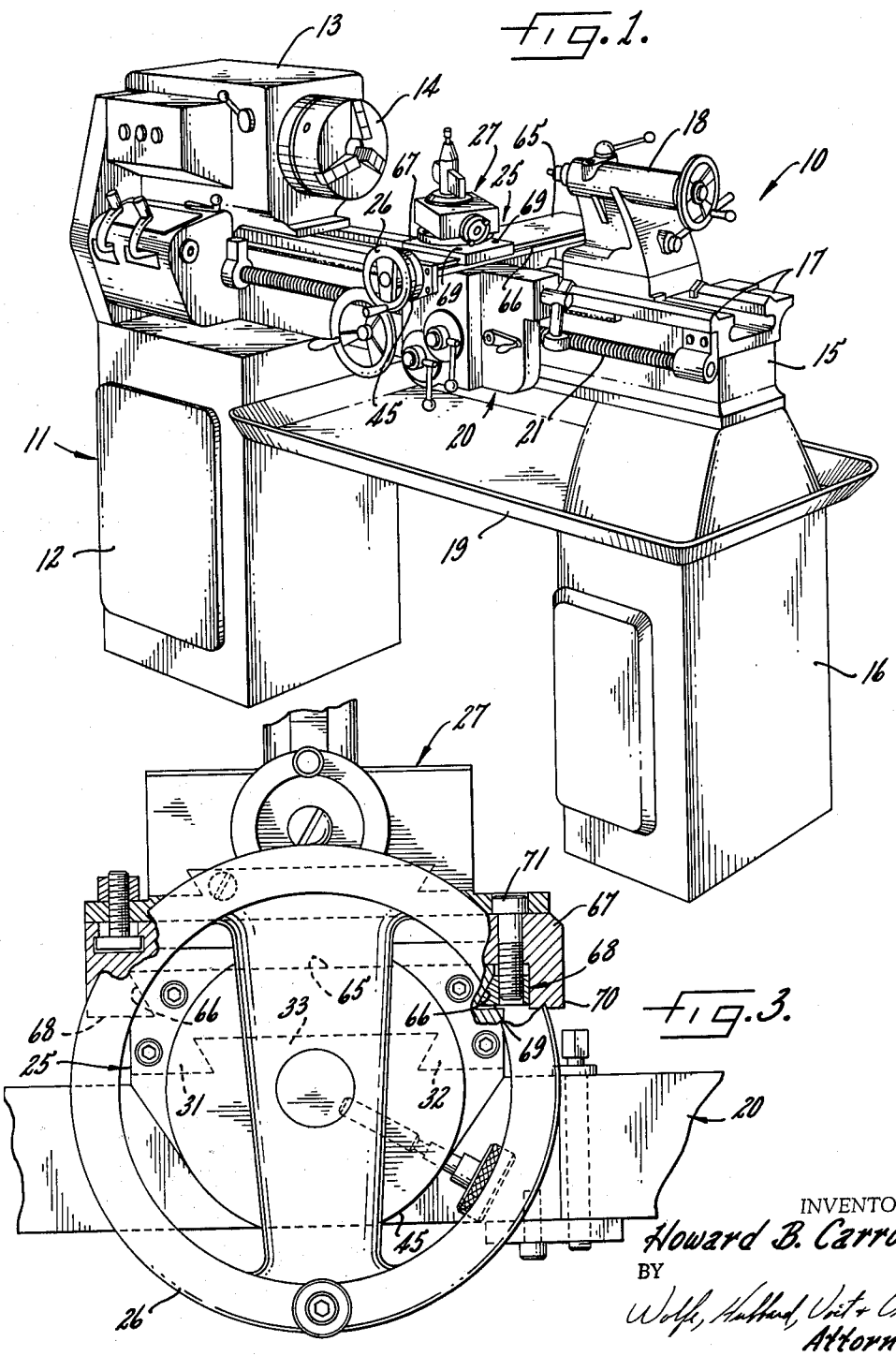
INVENTOR.
Howard B. Carroll,
BY
Wolfe, Hubbard, Voit & Osann
Attorneys.

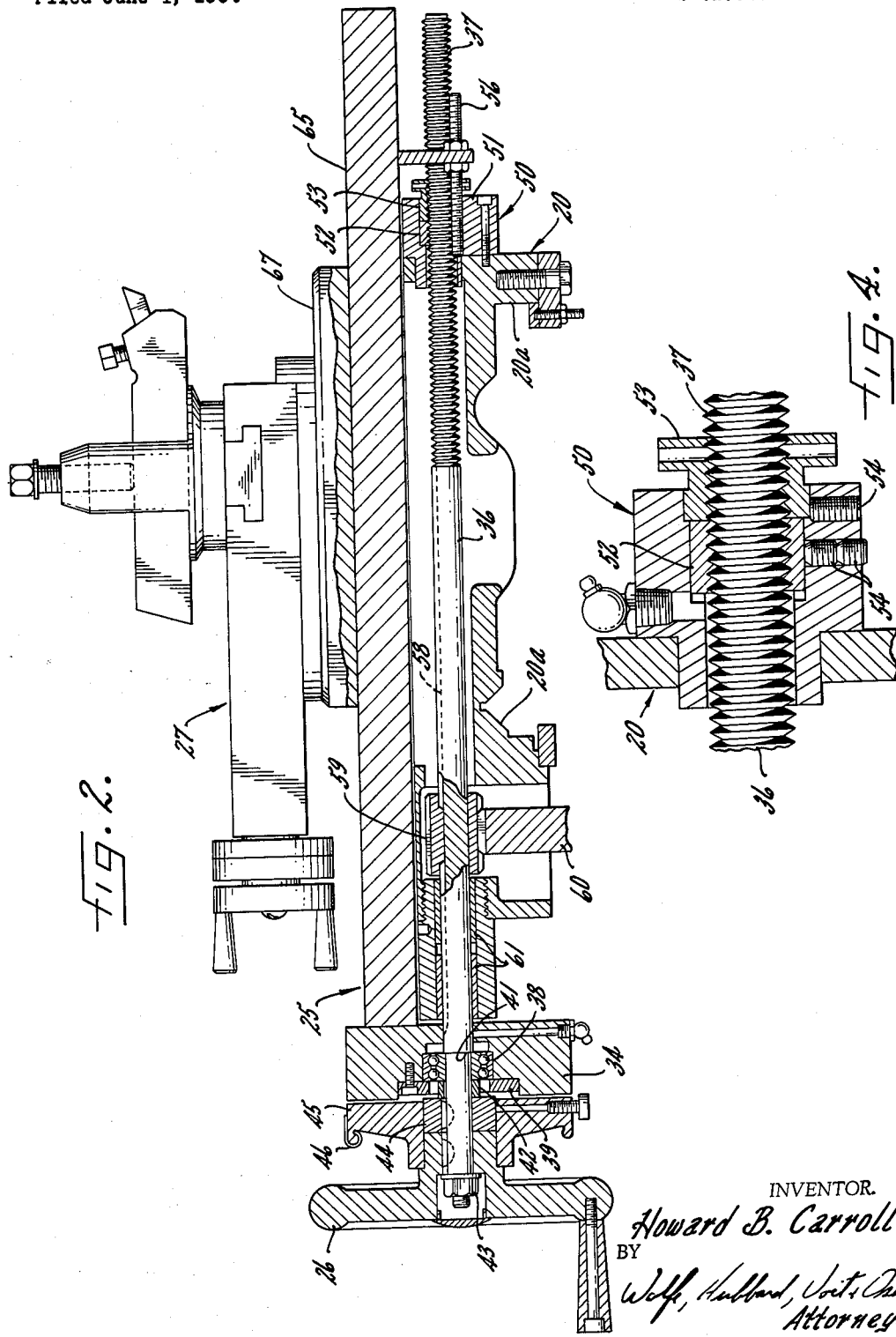

3,262,347
TOOL CARRYING ASSEMBLY FOR ENGINE LATHES
Howard B. Carroll, Winnetka, Ill., assignor to Sheldon Machine Company, Inc., Chicago, Ill., a corporation of Illinois
Filed June 1, 1964, Ser. No. 371,493
3 Claims. (Cl. 82—24)

This invention relates generally to machine tools and more particularly concerns metal working engine lathes.

The primary aim of the invention is to provide an engine lathe of increased versatility which is easily and conveniently operated.

More specifically, it is an object of the invention to provide a lathe in which the tool carrying compound can be easily and smoothly positioned to any point along the cross-slide, and the cross-slide moved by a travelling wheel and dial assembly facilitating tool control.

Other objects and advantages of the invention will become apparent upon reading the following detailed description and upon reference to the drawings, in which:

FIGURE 1 is a perspective of a lathe embodying the present invention;

FIG. 2 is an enlarged fragmentary section taken transversely through the carriage of the lathe shown in FIG. 1;

FIG. 3 is a further enlarged fragmentary elevation, with portions broken away and sectioned, of the structure appearing in FIG. 2; and FIG. 4 is an enlarged fragmentary section taken in a horizontal plane of a portion of the structure shown at the right hand side of FIG. 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown an engine lathe 10 embodying the present invention and including a pedestal base 11 having a left leg 12 that supports a headstock 13 in which is journalled a spindle 14 that is driven by a motor and transmission enclosed within the leg 12. A bed 15 extends from the headstock 14 over a right leg 16 defining a portion of the base. The bed 15 is formed with ways 17 which slidably support a tailstock 18. A chip pan 19 underlies the bed 15.

To carry the tooling, a carriage 20 is formed with ways 20a slidably mounted on the bed ways 17 between the headstock 13 and the tailstock 18. The carriage is associated with a feed screw 21 mounted on the bed 15 and adapted to be driven by the lathe motor. The function and operation of the parts so far described will be well known to those skilled in the art.

In accordance with the present invention, an elongated cross-slide 25 is mounted on the carriage 20 and provided with a following hand wheel 26, and a tool compound 27 is mounted for slidable positioning along the cross-slide 25. In the preferred embodiment, the cross-slide 25 is formed with dovetailed ways 31 and 32 surrounding, and covering, a transversely disposed bed way 33 formed on the carriage 20 (see FIG. 3). The cross-slide 25 carries a block 34 in which is journalled a translating screw 36 having a threaded end 37 connected to the carriage 20.

In the illustrated construction, a bearing 38 is recessed in the block 34 and clamped in place by a plate 39. The inner race of the bearing is sandwiched between a shoulder 41 formed on the translating screw 36 and a spacer 42 that is drawn tight by a nut 43 on the front end of the screw acting through the hub of the hand wheel 26 and a dial collar 44. The bearing 38 thus axially locks the translating screw 36 to the cross-slide 25 while permitting free rotation of the translating screw in response to turning of the hand wheel 26, which is keyed to the translating screw. A dial 45 is non-rotatably mounted on the hub of the hand wheel and the collar 44 and is provided with peripherally shiftable clips 46 to indicate desired positions of the translating screw.

In the lathe shown, a nut assembly 50 establishes the threadable connection between the translating screw 36 and the carriage 20. The assembly 50 includes a block 51 rigidly mounted within an aperture formed in the carriage 20 and supporting inner and outer nut members 52 and 53 respectively, which can be independently turned and locked in position by set screws 54. The nut members 52, 53, threadably engage the translating screw 36 and, being independently turnable, they are rotated and then locked in position so as to take up play between the translating screw 36 and the carriage 20. Preferably, the rear end of the cross-slide, that adjacent the nut assembly 50, carries an adjustable stop rod 56 (see FIG. 2) which abuts the rear surface of the bed ways 17 so as to define a limit position to cross-slide travel outwardly or to the left of FIG. 2.

The central portion of the translating screw 36 is formed with a spline groove 58 within which a driving pinion 59 is keyed. A cross feed gear 60 journalled in the carriage 20 and driven, selectively, from the feed screw 21, meshes with the pinion 59 so as to provide optional power feed for the cross-slide 25. The splined portion of the translating screw 36 is guided for axial sliding movement at the front of the lathe within bearings 61 mounted in the front of the carriage 20. The pinion 59 is trapped against axial movement within a recess in the carriage 20 and hence remains in engagement with the gear 60 as the screw 36 moves axially.

In carrying out the invention, the cross-slide 25 is formed with an upper, transversely extending, flat, mounting surface 65 with opposite dovetailed edges 66, and the compound 27 includes a base 67 slidably and flatly fitted on the mounting surface 65 and formed with dovetailed edges 68 that interlock with the carriage edges 66. One of the edges 68 is integral with the base 67 and the other is defined by a separate bar 69 that is vertically slidable against a depending flange 70 formed integrally with the base 67. A pair of socket head screws 71 adjustably hold the bar 69 in position and allow the bar to be drawn up snugly against the adjacent carriage edge 66 so as to securely lock the compound 27 in adjusted position along the cross-slide 25. It can thus be seen that the compound 27 can be slid into any one of an infinite number of positions along the full length of the cross-slide 25 and, by simply drawing up the two screws 69, the compound becomes solidly locked onto the cross-slide.

Manipulation of the hand wheel 26, or power supplied to the driving gear 60, is effective to transversely shift the cross-slide 25 on the carriage 20 and, the carriage 20 is, of course, translated along the bed ways 17 in the familiar manner.

The elongated cross-slide 25, with its full-length flat mounting surface 65, provides a range of compound positions which was not previously attainable with conventional engine lathes. The dovetailed, flat, engagement between the compound and the cross-slide gives solid tool support and ease in positioning the compound.

It will be noted that the hand wheel 26, the dial 45 and the adjacent block 34, which includes indicia marks cooperating with the dial 45, all travel with the cross-slide 25. This greatly simplifies manipulation of the cross-slide and places the hand wheel in a position which is always convenient to the operator. Also, the wheel 26 and the dial 45 can be formed with a large effective diameter for accurate feed and reading. It will be appreciated that with an elongated slide the conventional engine lathe practice of fixing the slide translating wheel on the carriage would require a small wheel and dial to clear the slide.

With further reference to the features of this design, it will be appreciated that the cross-slide 25 is always firmly mounted on the carriage 20 since the full length of the carriage ways are utilized in all positions of the cross-slide. Furthermore, the carriage ways carrying the cross-slide are covered by the latter, and hence, are protected against inadvertent damage.

Since the compound 27 can be moved along the whole length of the cross-slide 25, and, of course, swiveled to any desired angle, the compound can be positioned for maximum carriage support and with a minimum of overhang even when turning large diameters. If it is more convenient to machine from the rear side, the compound can be easily moved to that end of the cross-slide with no necessity for employing an accessory cross-slide having a rear tool position.

A further advantage of the design of the cross-slide 25 is the possibility of mounting a second compound on the cross-slide so that tools can be carried at both front and rear tool positions. Such multiple station setup can be easily arranged with a minimum amount of slide travel required for tool clearance since both front and rear mounted compounds would be positionable along the cross-slide.

Rather than mount a second compound on the rear portion of the cross-slide 25, the cross-slide is readily adapted for receiving a hydraulic tracer unit which would greatly increase the versatility of the lathe while still leaving the front portion of the cross-slide free for supporting a compound and providing a front tool station.

I claim as my invention:

1. In an engine lathe having a headstock and bed ways supporting a tailstock, the combination comprising a carriage slidably mounted on said bed ways between said headstock and said tailstock, an elongated cross-slide mounted on said carriage for sliding movement transversely of said bed ways, a translating screw rotatably mounted on said cross-slide and carrying a hand wheel, means providing a threadable connection between said screw and said carriage so that rotation of said hand wheel translates said cross-slide on said carriage, a compound slidably mounted on said cross-slide for adjusting movement the length of the cross-slide transversely of said bed ways, and means for locking said compound to said cross-slide in any slidably adjusted position.

2. In an engine lathe having a headstock and bed ways supporting a tailstock, the combination comprising, a carriage slidably mounted on said bed ways between said headstock and said tailstock, an elongated cross-slide mounted on said carriage for sliding movement transversely of said bed ways, a translating screw rotatably mounted on said cross-slide and carrying a hand wheel, means providing a threadable connection between said screw and said carriage so that rotation of said hand wheel translates said cross-slide on said carriage, said cross-slide having an elongated, transversely extending, flat, upper mounting surface with dovetail edges, a compound flatly fitted on said mounting surface with a pair of dovetailed portions underlying said edges, one of said portions being movably mounted relative to said compound, and a clamping element for drawing said movable dovetail portion tightly against said edge so as to selectively lock the compound on said cross-slide.

3. In an engine lathe having a headstock and bed ways supporting a tailstock, the combination comprising, a carriage slidably mounted on said bed ways between said headstock and said tailstock, an elongated cross-slide mounted on said carriage for sliding movement transversely of said bed ways, a translating screw connecting said cross-slide and said carriage for translating said cross-slide on said carriage, said cross-slide having an elongated, tranversely extending, flat, upper mounting surface with dovetail edges, a compound flatly fitted on said mounting surface with a pair of dovetailed portions underlying said edges, and a clamping element for selectively locking the compound on said cross-slide.

References Cited by the Examiner
UNITED STATES PATENTS
2,897,578   8/1959   Strom _____ 82—24 X
FOREIGN PATENTS
1,244,398   9/1960   France.
144,496   6/1920   Great Britain.

WILLIAM W. DYER, JR., *Primary Examiner.*
L. VLACHOS, *Assistant Examiner.*